United States Patent [19]

Schier

[11] Patent Number: 5,996,933
[45] Date of Patent: Dec. 7, 1999

[54] AIRCRAFT

[76] Inventor: Johannes Schier, Im Malerwinkel 1, D-53604 Bad Honnef, Germany

[21] Appl. No.: 09/068,067

[22] PCT Filed: Oct. 23, 1996

[86] PCT No.: PCT/EP96/04590

§ 371 Date: Apr. 28, 1998

§ 102(e) Date: Apr. 28, 1998

[87] PCT Pub. No.: WO97/16343

PCT Pub. Date: May 9, 1997

[30] Foreign Application Priority Data

Oct. 28, 1995 [DE] Germany .......................... 195 40 272

[51] Int. Cl.$^6$ ............................................... B64C 27/00
[52] U.S. Cl. ............................ 244/17.11; 244/17.19; 244/17.21
[58] Field of Search .................... 244/17.19, 17.21, 244/7 A, 17.11, 23 C

[56] References Cited

U.S. PATENT DOCUMENTS

| 2,551,455 | 5/1951 | Neale | 244/17 |
|---|---|---|---|
| 3,135,481 | 6/1964 | Sudrow | 244/23 |
| 3,394,906 | 7/1968 | Rogers | 244/23 |
| 3,417,825 | 12/1968 | Ramme | 244/17.19 |
| 3,489,374 | 1/1970 | Morcom | 244/12 |
| 5,163,638 | 11/1992 | Chaneac | 244/17.19 |

FOREIGN PATENT DOCUMENTS

| 1038846 | 10/1953 | France . |
|---|---|---|
| 2532273 | 3/1984 | France . |
| 3729231 | 3/1989 | Germany . |
| 295177 | 8/1928 | United Kingdom . |

*Primary Examiner*—J. Woodrow Eldred
*Attorney, Agent, or Firm*—Brown & Wood, LLP

[57] ABSTRACT

For an aircraft (1) having a balancing torque and including a motor-driven propeller (5) arranged on a central axis (3), and a useful load container (6), a solution should be provided which would insure that the aircraft is capable of carrying useful loads in a stable flying attitude and with simple control means.

This is achieved by that the central propeller (5) driven by the drive motor (4), on one hand, and relative thereto, the motor (4) and/or torque-balancing means arranged thereon, on the other hand, are rotatable in opposite directions and together are supported for rotation relative to the useful load container.

At that, the drawing figure to be published: FIG. 1.

11 Claims, 9 Drawing Sheets

AIRCRAFT

The invention relates to an aircraft which has a balanced torque and includes a motor-driven propeller, which is arranged on a central axis, and a useful load container, in particular but not exclusively, to a coleopter-aircraft.

Literature discloses a number of coleopter-aircrafts which operate in accordance with different principles. A coleopter-aircraft, which operates in accordance with the air cushion principle, is disclosed in WO 90/13478. A similar aircraft, at least with respect to the flight theory, is disclosed in DE-40 37 472 A1. DE-41 12 585 also deals with a similar principles, in which propulsion turbine is provided together with a lift propeller.

Other solutions are disclosed in DE-37 34 811 A1, DE-36 44 899 A1, DE-36 06 362 A1, and EP-O 661 206 A1.

The main problem of the known solutions consists in the unstable flight attitude, poor control possibility, and high technical requirements, so that it is difficult to come up with solutions which would permit to achieve adequate flight characteristics.

An object of the invention is to provide a solution which would insure that the aircraft can carry useful loads and/or persons in a stable flying attitude and with simple control means.

This object is achieved according to the invention by that the central motor-driven propeller and, relative thereto, the motor and/or torque-balancing means arranged thereon, are rotatable in opposite directions, and together are supported for rotation relative to the useful load container.

The invention makes possible to insure a very stable adjustable flight attitude with comparatively simple means, i.e., a so-equipped aircraft is capable of retaining the useful load in a predetermined position which, e.g., is particularly important when the useful load consists of instruments or of a monitoring camera for inspection of a constructional site, to name one example.

Further, examples of torque-balancing means according to the inventive solutions will be discussed below. One of the possibilities according to the invention, which proved itself in practice, consists in using an annular wing in connection with a propeller driven relative thereto as the torque-balancing means.

In the coleopter-aircraft according to the invention, for providing a very stable flight attitude, a torque reaction of the motor, on one hand, and of the propeller, on the other hand, are used. The drive consists of the propeller drive and the annular ring drive.

Because the propeller rotates in the annular wing, which is formed as a circular ring, it operates as a ducted propeller, i.g., at the same rotational speed of both rotatable relative to each other drive units, a double thrust force is generated in comparison with a non-ducted propeller. In addition, the generation of noise is reduced.

The annular wing drive is provided by the generation of vacuum on the upper side of the annular wing with an air stream produced by the propeller, which is known also as a Coanda-effect, under which is understood a deviation of the stream when a stationary body is brought on the boundary layer of the stream. At that, the air stream will deviate in the direction of the stationary body and will generate a reaction force due to the impulse change, which force provides lift and thrust components. In addition, pressure distribution on the annular wing changes, and a vacuum is formed on the upper surface of the annular wing, which results in additional suction thrust and results in an increased lift curve slope.

The invention makes it possible to easily position the useful load in the air because the aircraft according to the invention combines flight characteristics of a helicopter with those of a horizontally flying aircraft, and makes use of the advantages of both flying apparatuses.

The particularly simple control and simple operation permits to use such a coleopter-aircraft for performing a great number of tasks. Here, only some will be named:

Scouting of polluted sites,
Collection of biotops,
Survey of a forest damage,
Fighting forest fires (dumping of nitroglycerin),
Water protection (shores, lakes, rivers),
Monitoring the traffic,
Protection from emission
Emission control,
Measurement of thermal loads,
Monitoring of mountain damages,
Measurement of a radioactive radiation in regions with nuclear power plants,
Monitoring of pipeline (oil, gas, water),
Monitoring of large industrial zones and plants,
Analysis of pollutant in the air,
Elucidation of expedition,
Immediate overview of catastrophic cases,
Land and water survey (airphotogrammetry),
Mixed searches in rough areas,
Control of natural reserves (protection of species, counting, observation),
Airborn remote sensing and remote data transmission),
Feature films and TV-productions (producing tricks, camera guiding), aerial survey and filming (of houses, plants, estates, etc.),
Reconstruction documentation,
Automatic border monitoring,
Control of see and ship navigation, measurement of the wind for evaluation of wind (Wind power plants),
Inspection of overhead power lines,
Inspection of buildings, bridges, towers, and dams,
As airborn cranes and load carriers,
As flying emergency vehicles for people in different situations,
As exclusive advertising for TV-stations and international, renowned advertising agencies,
TV-reporting (live from dangerous regions, e.g., Bosnia),
Control of United National Protection zones or armistice regions.

Advantageous embodiments of the invention are defined by subclaims.

Preferably, the annular wing is formed of a substantially hollow annular body provided with a plurality of outwardly located wing elements occupying a substantially horizontal position in the rest position. With this embodiment, the wing elements of a predetermined type provided on the circumference of the annular body adjacent to the propeller, provide for an additional lift. The hollow annular body, if necessary, can be used as a tank, as it is rigidly connected with the motor carrier, and thereby a simple delivery of the fuel to the motor becomes possible.

The arrangement of the wing elements or the side wings on the outer circumference of the annular wing provides for additional lift due to the Magnus-effect, with the arrangement and the number of the wing elements, as a rule, being defined by the amount of the useful load.

The side wings rotate, e.g., with a speed of about 300 revolution/min and generate, by their profile in the same way as a conventional aircraft supporting surface, an aerodynamic lift. The number of supporting surfaces depends, as it has already been discussed, on the necessary lift.

The additional effect is achieved by the fact that in the exhaust stream of the propeller, there are provided exhaust turbine blades fixedly connected with the annular ring for joint rotation therewith, whereby the lift power is additionally increased.

A particularly simple control of the aircraft with an annular wing according to the invention can, e.g., consist of two alternatives, something like in providing a pivoting device rotatable about a support axle in the transition region between the drive motor with the propeller and the annular wing, and the useful load container, for changing the vertical angle between the drive means axis, on one side, and the useful load container axis, on the other side.

A variant of this simple control possibility consists in that in the transitional region between the drive motor with the propeller and the annular wing and the useful load container, there is provided a push-drive for displacing the drive means axis in its operational line to the central axis of the useful load container in order to adjust the pivot points of the system.

At that, it is possible to effect the displacements or the pivot movement with a servo-motor.

In a further embodiment, the useful load container landing gear can be equipped with GPS-antennas, obstacle-sensing antennas, altitude control antennas, antennas for receiving radio signals when TV-control is used, and so forth.

It is contemplated to provide the cone point of the propeller with a receptacle for receiving a parachute, braking sack and the like.

As it has already been discussed, there exist other possibilities of providing torque-balancing means according to the invention. Thus, according to the invention, the exhaust turbine itself can serve as a torque-balancing means. Further, a ring, a disc, a cylinder, a rotatable collar with a side wing, rotatable in opposite direction, can be used as torque-balancing means.

Another possibility consists in using of oppositely rotatable elements of the drive motor and/or an oppositely rotatable second motor as torque-balancing means.

According to the invention, there is further provided a rotary rudder for obtaining a slant position and thereby a propulsion. Also, the torque-balancing means can comprise rotatable masses, adjustable radially outwardly and/or inwardly with electrical, hydraulic or pneumatic means or controlled by a centrifugal force, and equipped, if necessary, with buffer springs.

For improving the aerodynamics and for reducing the noise, according to the invention, the propeller with the central shaft, the drive motor and the torque-balancing means can be surrounded with aerodynamically formed sheathings.

Further features, particularities, and advantages of the invention will become apparent from the following description with reference to the drawings. The drawings show.

An aircraft, which is generally designated with 1 or 1a (FIG. 4) is formed of an annular wing 2, which is shaped in cross-section as a main supporting surface, a propeller 5 concentric with the general central axis 3 and driven by a motor 4, and a useful load container 6 connected with this drive unit.

The annular wing 2 is fixedly connected with annular wing support 7, with the useful load container 6 being so connected with the drive unit, which is formed of the propeller and the annular wing 2, by a pivoting support generally designated with 8, that the drive unit can pivot with respect to the useful load container 6 the position of which is stabilized with a rotary rudder 9.

Figure 2:
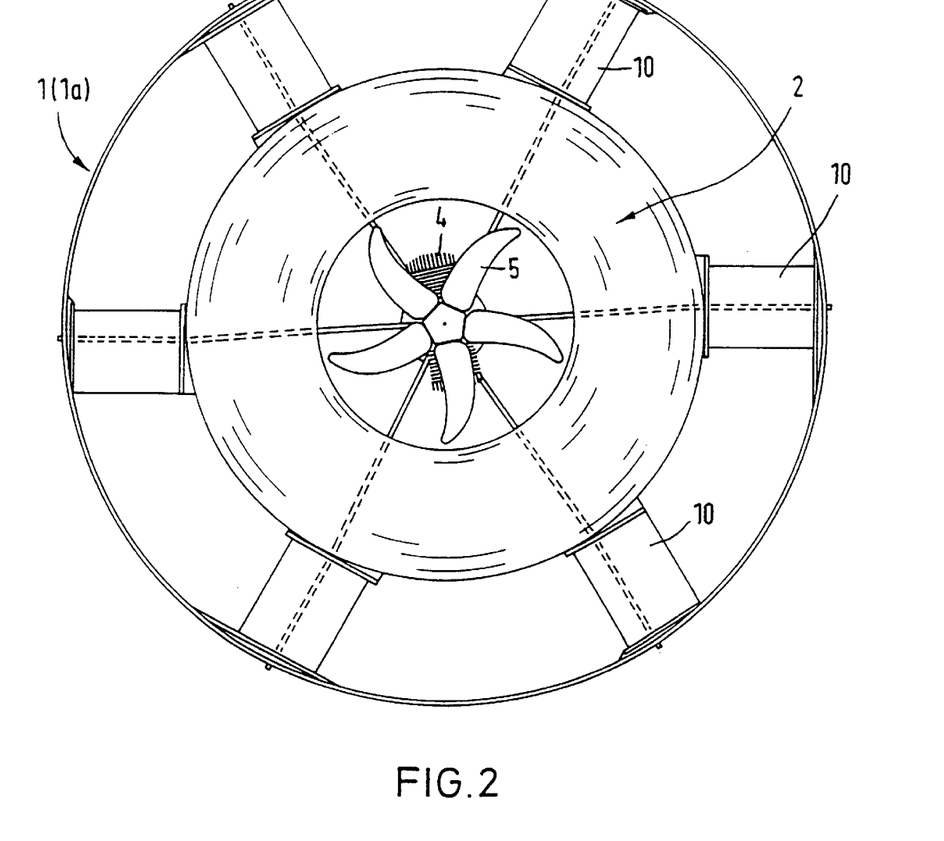
FIG. 2 a view according to arrow II in FIG. 1.

For increasing the lift, a number of measures is undertaken. Thus, the annular wing 2 has on its outer circumference, in the embodiment shown in FIG. 2, six wing elements 10, on the other side, there is provided, in a direction of an air stream generated by the propeller 5, a guide funnel 11 provided with exhaust turbine blades 12 at its free end.

Figure 1:
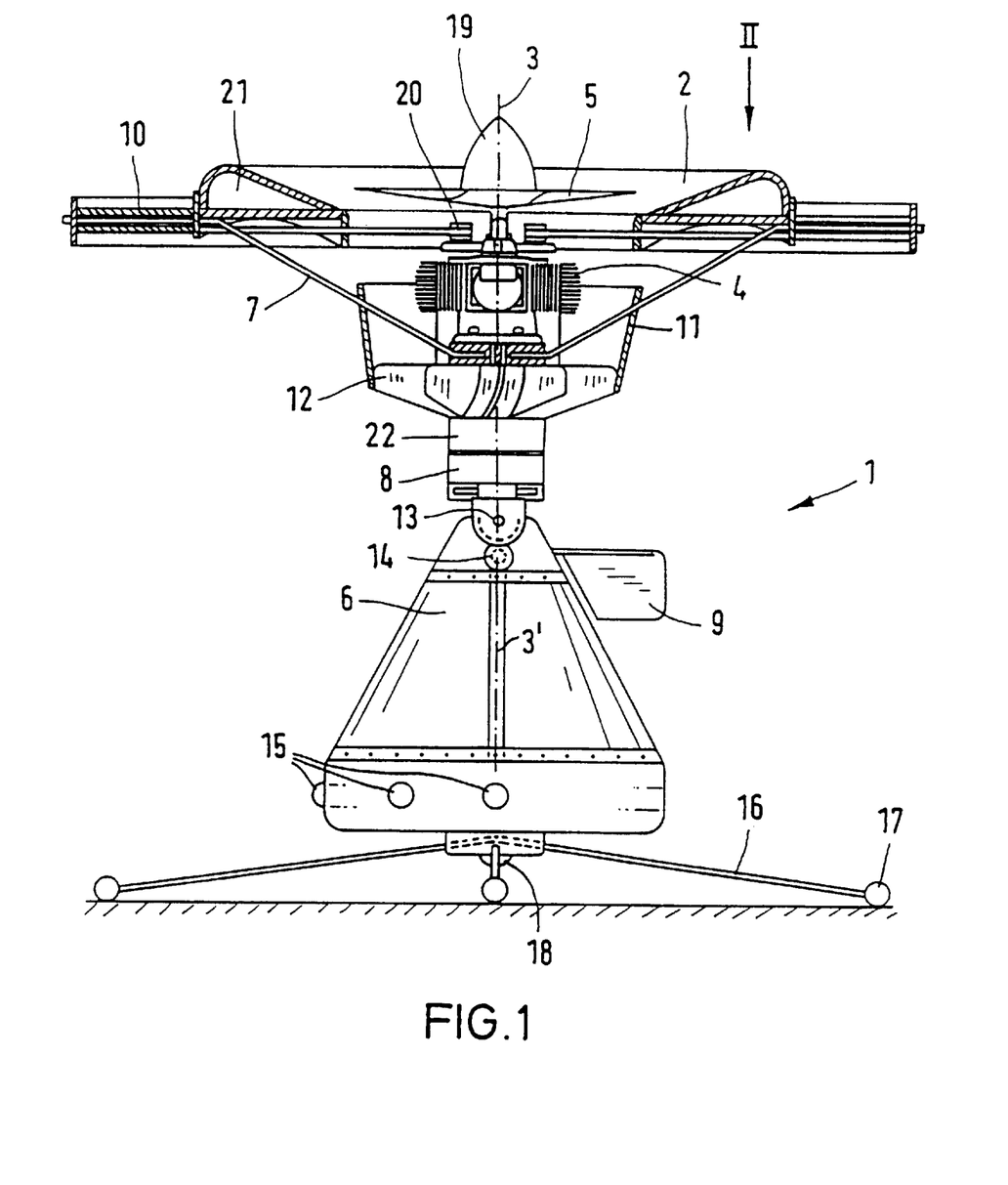
FIG. 1 a partially cross-sectional side view of a simplified embodiment of the invention.
Figure 3:
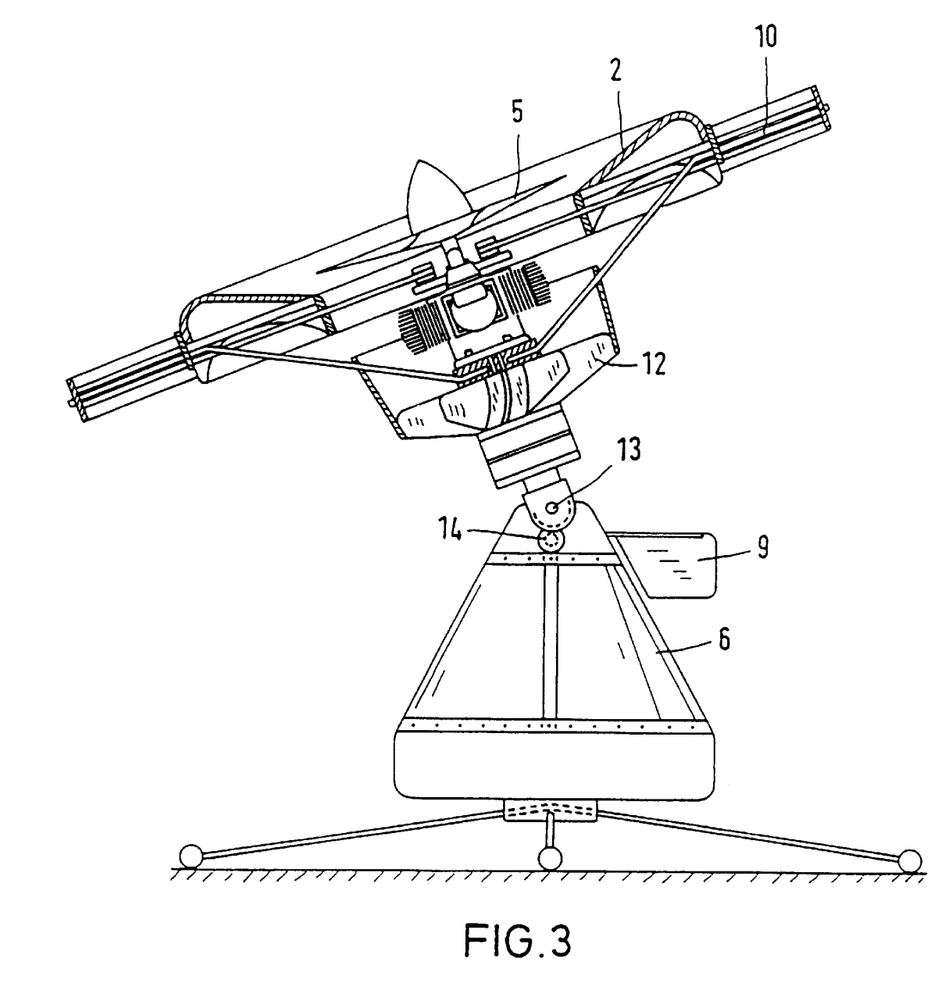
FIG. 3 a side view of an aircraft according to the present invention in a forward flight position according to one embodiment of the invention.

As it is particularly shown in FIG. 1, in the embodiment shown there, in the transitional region between the useful load container 6, on one hand, and the drive unit formed of the motor, propeller and the annular wing on the other hand, there is provided a device which enables a pivotal movement of these two unit relative to each other about an axle journal 13. To this end, only schematically shown, a servo-motor 14 can be used. Thereby, it is possible to pivot a unit from a position shown in FIG. 1 into a position shown, e.g., in FIG. 3.

For a vertical movement of the useful load container 6, the drive unit is so actuated that the propeller 5 rotates in one direction and the annular wing 2 with outer wing elements 10 rotate in another direction, so that two left components, thus generated, are added, with the opposite rotational lift components being reinforced by action of the exhaust turbine blades 12. In order to achieve propulsion in a horizontal position, the servo-motor 14 is actuated in order to provide a position shown, e.g., in FIG. 3, in such a way that the horizontal and vertical components overlap to enable a forward flight.

A number of further elements, necessary or useful for control and operation of the useful load, can be provided on the useful load container 6. Thus, a number of obstacle-sensing antennas 15 can be distributed over the circumference, a so-called GPS-antenna 17 can be provided on landing gear 16, at least one altitude control antenna 18 and so forth can be further provided.

A parachute or a braking sack, not shown here, can be arranged in the propeller cap 19. In the upper portion of FIG. 1, a slide bearing 20 for the annular wing 2 is shown. As shown, the annular wing 2 has an inner hollow space 21, which can be used, e.g., as a reservoir. Another possibility of providing a reservoir or a tank is to arrange it in a space above the rotatable support 8, with the tank being there designated with 22.

Figure 4:
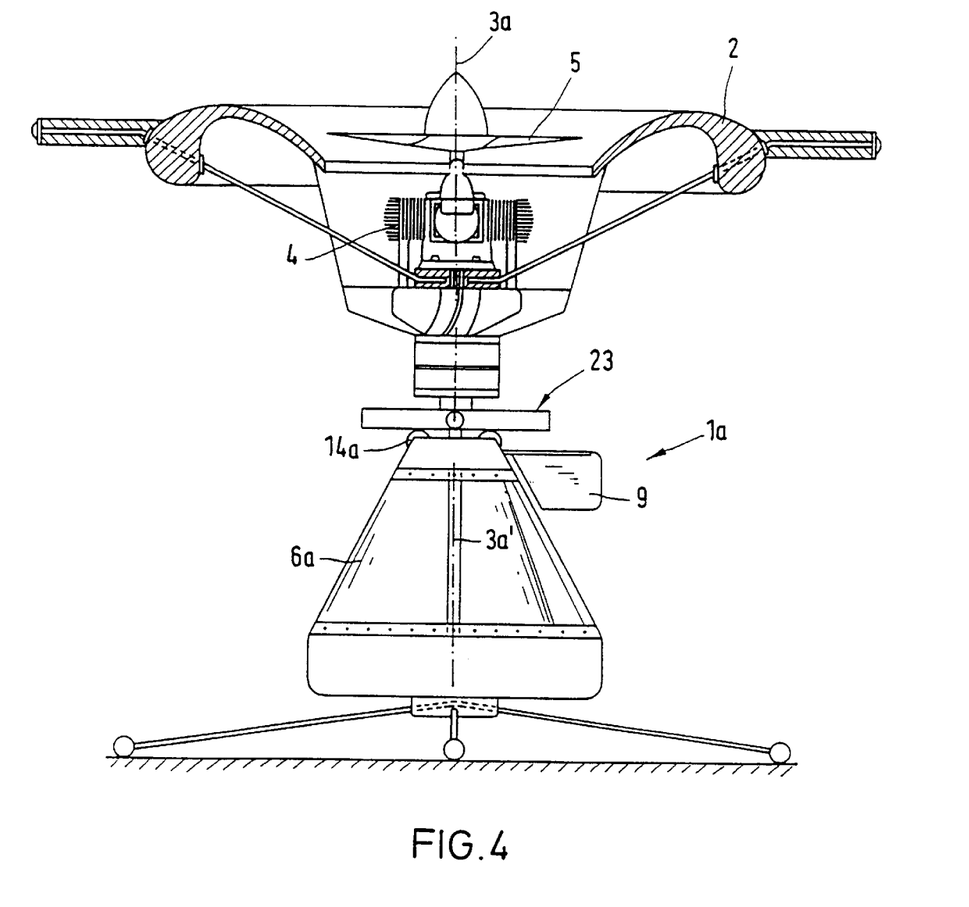
FIG. 4–11 further side views, partially with simplified principle layout, of modified embodiments of the invention.

In FIG. 4, another possibility of a horizontal flight control with similar elements is illustrated. Here, the useful load container 6a is provided, in the transitional region toward the drive unit formed of the motor 4 and the annular wing 2 with an inwardly arranged propeller 5, with a push-drive generally designated with 23, whereby the useful load container 6a is displaced horizontally with respect to the drive central axis 3a. Thereby, upon a corresponding displacement, the common center of gravity becomes offset which lead to the inclination, in particular, of the annular wing 2 with the propeller 5, in such a way that a horizontal flight in the example according to FIG. 3 becomes possible.

Another possibility, not shown in the drawings, of an increased lift consists in providing the upper surface of the annular wing 2 with guide blades.

Figure 5:
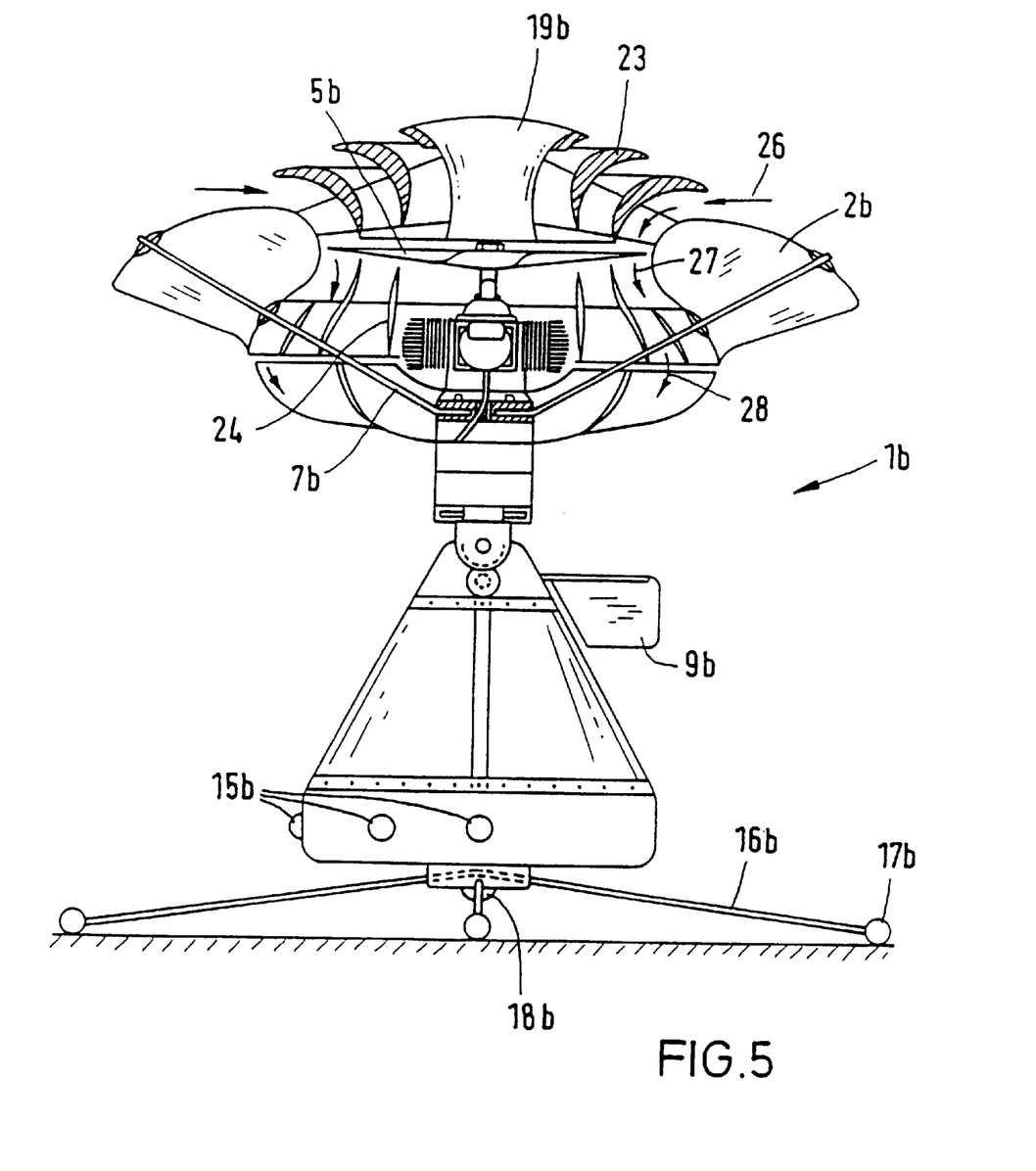

FIG. 5 shows another modified embodiment of the invention. The coleopter-aircraft generally designated with 1b has an annular wing 2b supported on an annular ring support 7b, with all elements functionally similar to those of the embodiments described above being designated with the same reference numerals with a letter-index "b".

Contrary to the previously described embodiments, here, the propeller 5b is provided above with in inlet diffusor 23 and, beneath, with an outlet diffusor 24, in such a way that the efficiency is increased. Thus, as shown with a small arrow 26, the lifting speed in the diffusor 23 can reach 30 nm/sec. The speed accelerates and reaches, e.g., as shown with arrow 27, 35 m/sec and then is reduced, reaching at the location designated with arrow 28, 10 m/sec.

The diffusor shape provides for generation of a vertically operating propulsion component that increases the lift. A divergent stream, which is generated at the outlet by the outlet diffusor 24, results in a decrease of the stream velocity, whereby the genetic pressure also decreases and in the same proportion as the static pressure increases, so that diffusor insures that the greater portion of the exit energy of the air stream can be recovered as pressure energy.

With optimally formed diffusers, from 80 to 90% of the kinetic pressure is converted into the static pressure, whereby simultaneously a decrease of the notice emission of the propeller can be achieved as a supplementary effect.

As it has already been mentioned above, a parachute can be released from the cap 9 or the propeller spinner 19 in case of failure of the drive and connected therewith a danger of falling down. Another possibility consists in providing side wings 10, as shown in FIG. 1, at the outer edge of the centrifugal weight so that it can be brought into an automatic rotational position. The downward component of the descent speed of the aircraft increases the rotational speed of the annular wing, and it is possible to alter the angle of incidence of the centrifugal weight 25 to slow the speed of the downfall. When the rotational speed decreases, the angle of incidence can again be readjusted to increase the descent speed which again increases the rotation, with the centrifugal weight again being brought into action, and so forth.

FIGS. 6–12 show, in a simplified form, elements which are particularly relevant for balancing of the torque. The element, which are functionally similar to those of FIG. 1, are designated with the same reference numerals.

Figure 6:
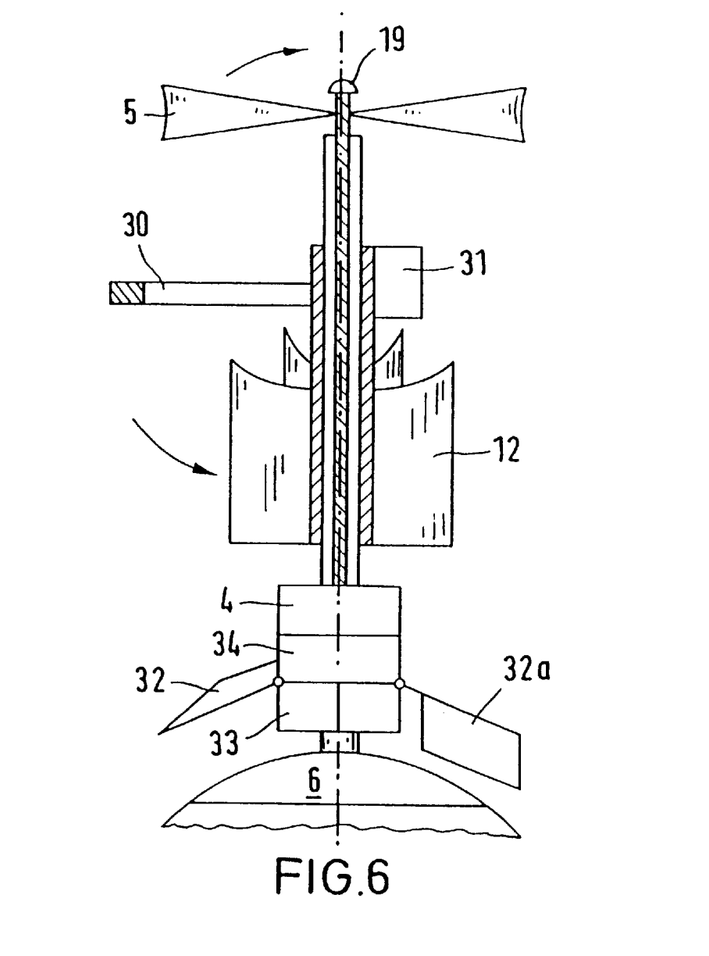

In FIG. 6, the motor 4 drives the propeller 5, e.g., rightward, as shown by an arrow, while the downwardly directed air stream of the turbine 12 rotates in a opposite direction. operationally, the turbine 12 is connected, e.g., with a rotatable collar or ring 30 (left half of FIG. 6), or a rotatable disc, or a rotatable cylinder 31 (right half of FIG. 6), each of which serves for balancing the torque.

Figure 7:
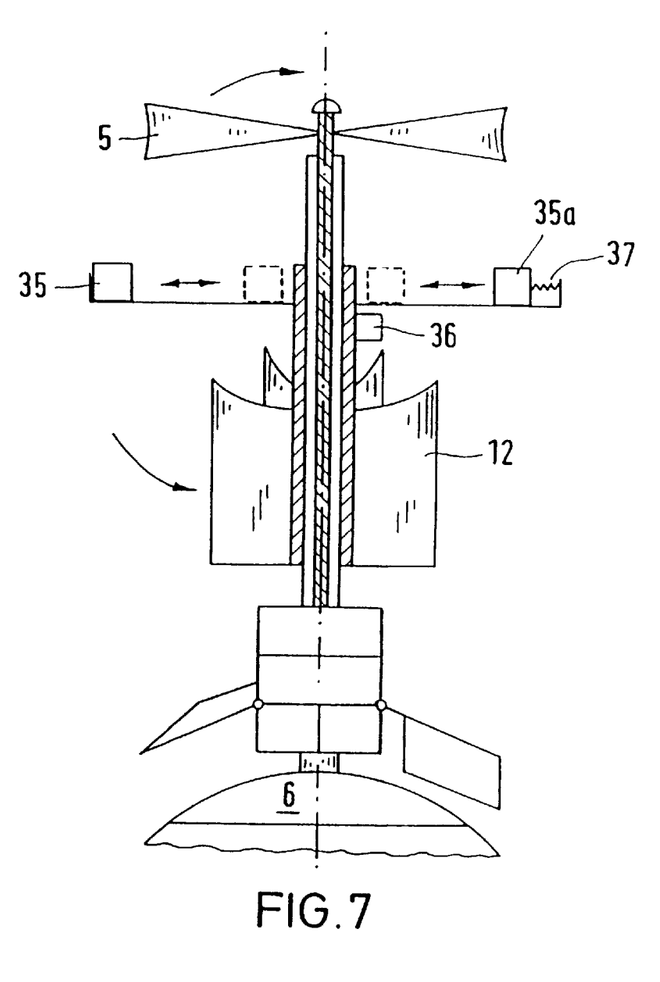

In the embodiment shown in FIGS. 6–7, there is provided a pitching rudder 32 or 32a with which the aircraft can so be pivoted that not only upward and downward movements but also propulsion are possible. To effect the pitching or rocking motion, pivot boosters 33 are provided. An auxiliary apparatuses, e.g., a fuel tank 34, an accumulator, a generator and the like are associated with the motor.

The left half of FIG. 7 shows a possibility of providing rotatable masses 35 the position of which, e.g., can be changed with servo means 36. The right half shows a possibility of providing a spring, gaseous or fluid damping. E.g., the position of the masses 35 can be adjusted with, e.g., a liquid or gaseous cylinder. In this place, another particularity should be pointed out, namely, that it is possible, e.g., to adjust the turbine blades with the servo means 36 whereby torque balancing can be effected.

Figure 8:
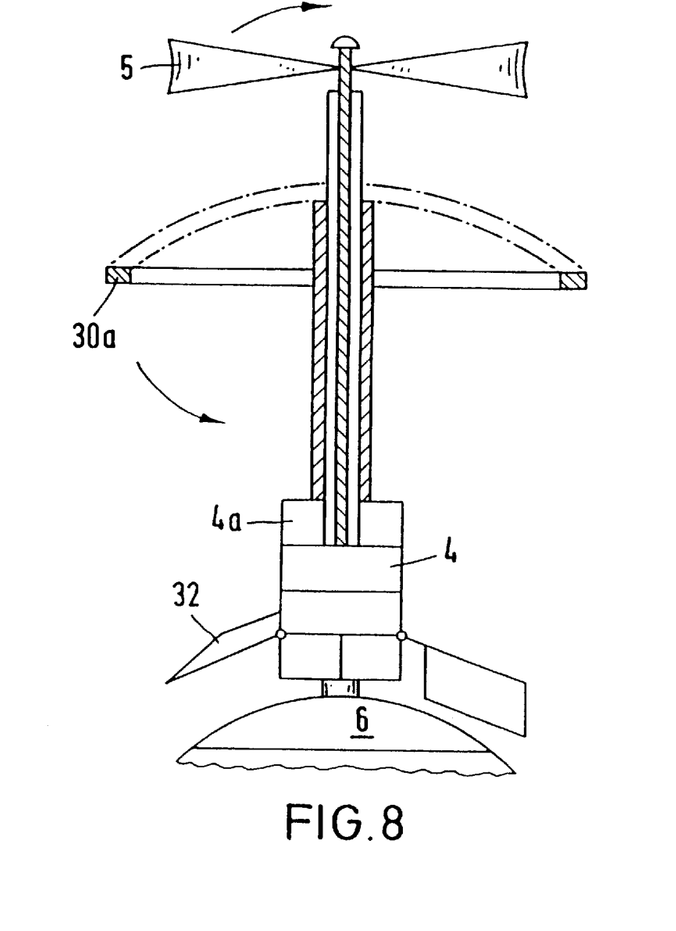

FIG. 8 shows an embodiment in which in addition to the drive motor 4 for the propeller 5, another motor 4a can be provided in order, e.g., to rotate the centrifugal ring 30a in an opposite direction. Here also, a cylinder, a disc or the like can be provided. However, it can be seen that a corresponding turbine is absent.

Figure 9:
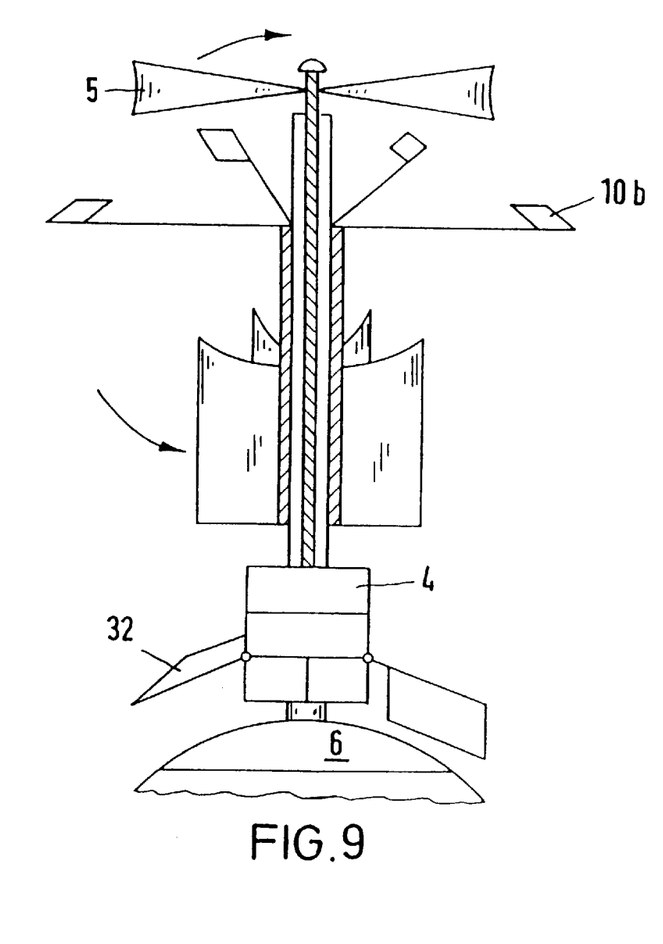

FIG. 9 shows a possibility of providing rotatable side wings 10b, the position of which can be adjusted, e.g., with servo means or the like, not shown in detail.

Figure 10:
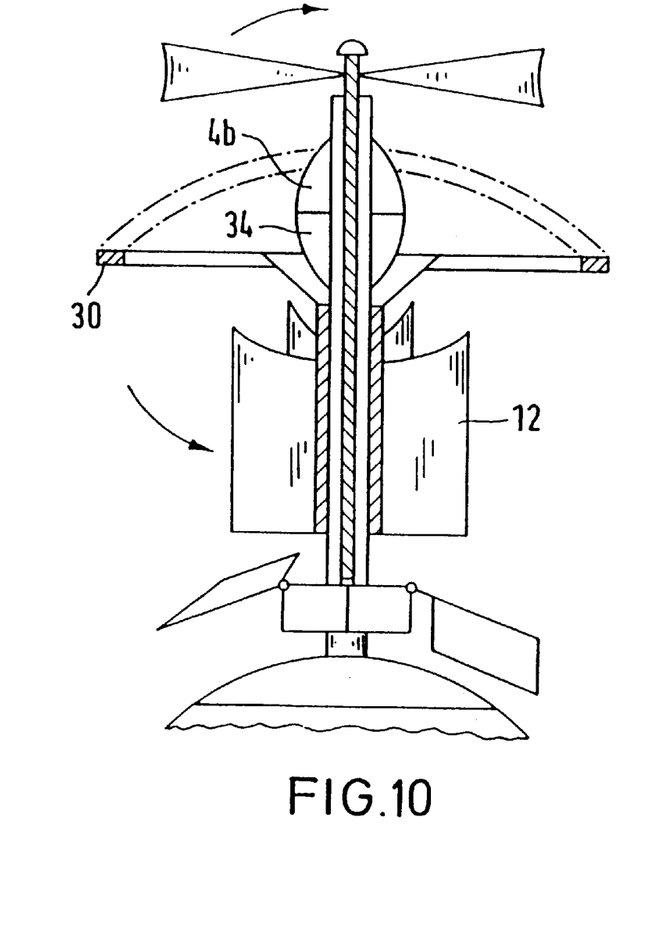
Figure 11:
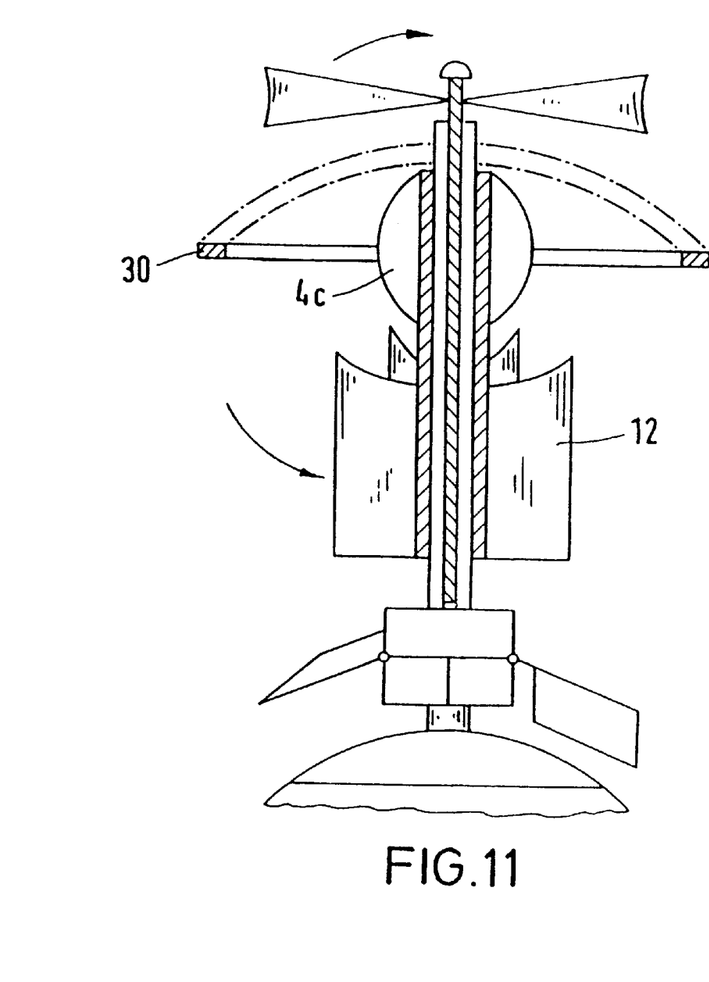

FIG. 10 shows a possibility of arranging the motor 4b above the turbine 12 and, if necessary, in association with a tank, an accumulator or a generator 34.

Figure 12:
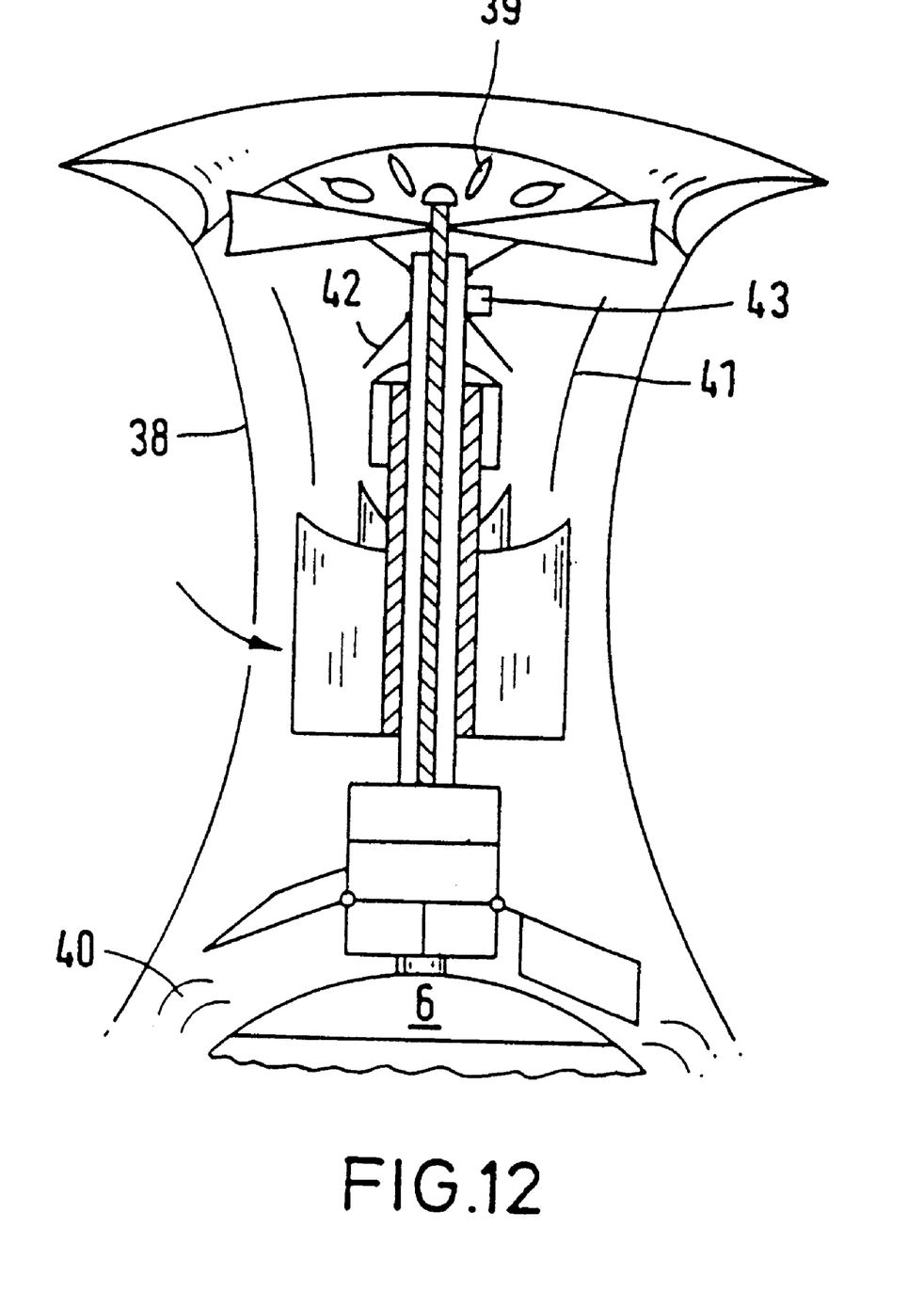
FIG. 12 a simplified view of an aerodynamic fairing.

In FIG. 4, only a motor 4c is provided in the region of rotatable rings 30. Here also, e.g., means can be provided which would rotate an element of the motor, the propeller in one direction while another element of the motor, the ring 30 are rotated or driven in an opposite direction. In such a case, the turbine 12 can be dispensed with. Finally, another possibility is shown in FIG. 12 which consists in providing of all of the elements with an aerodynamic sheathing, which forms, together with upper stream guiding blades 39 in section diffusor and lower guiding blades in an exhaust diffusor, a stream well which, together with the optimization of the stream, results in noise reduction. Also, inner guiding blades 41 can be provided, which is not shown in the drawings. Generally, spoilers 42 can be provided the position of which is adjustable with servo means 43.

Naturally, the described embodiments according to the invention can be modified in many respects, without deviating from the basic concept. The invention, in particular, is not limited to the disclosed here, advantageous shape of the useful load container, nor to the, shown here in a simplified form, shape of the annular wing, or the externally arranged wing elements, and so forth. That a variety of aircrafts according to the invention can be produced results from the fact that the corresponding functional stages can be positioned with respect to each other in any desirable order. The drive unit, the turbine, the antitorque means, and the useful load container can arbitrarily change their position relative to each other, without endangering the operational capability of an aircraft. Changing the position of the center of gravity or the pitching rudder provide for an alternative control, and so forth.

I claim:

1. A torque-balanced aircraft, comprising coaxially arranged an annular wing; a central propeller; a drive motor for driving the central propeller; a useful load container; and servo drive means arranged between the drive motor and the useful load container for displacing the useful load container relative to the drive motor;

wherein the annular wing serves as torque-balancing means; and wherein at least one of the drive motor and the annular wing is rotatable in a direction opposite to a rotational direction of the propeller and both the drive motor and the annular wing are rotatable relative to the useful load container.

2. An aircraft according to claim 1, wherein exhaust turbine blades (12) connected with the annular wing (2) for joint rotation therewith are provided in an exhaust stream of the propeller (5).

3. An aircraft according to claim 1, wherein the annular wing is formed as an annular substantially hollow body (2) with outwardly arranged, substantially horizontally aligned, in a rest position, wing elements (10).

4. An aircraft according to claim 1, wherein the annular wing (2) is provided with guide blades on its outer surface for enhancing drive.

5. An aircraft according to claim 1, wherein a pivot device provided in a transition region between the drive motor (4) with the propeller (5) and the annular wing (2) and the useful load container (6) pivots about an axle journal (13) for changing a vertical angle between a drive axis (3) and useful load means axis ($3^1$).

6. An aircraft according to claim 1, wherein a push drive (23) is provided in a transition region between the drive motor (4) with the propeller (5) and the annular wing (2) and the useful load container (6) for adjusting the center of gravity of entire system in order to displace a drive central axis (3a) in its operational line relative to a central axis ($3a^1$) of the useful load container.

7. An aircraft according to claims 1, wherein an inlet diffuser (23) above the propeller (5) and an exhaust diffuser (24) beneath the propeller (5) (FIG. 5) are provided.

8. An aircraft according to claim 1, wherein there are provided one of wing elements and side wings (10) provided, at an outer edge, with centrigufal masses (25) for changing an operating angle of the side wings (10) upon failure of an aircraft (1) drive.

9. An,aircraft according to claim 1, wherein the propeller (5) with a central shaft, the drive motor and the torque-balancing means are surrounded with an aerodynamic sheathings.

10. A torque-balanced aircraft, comprising coaxially arranged a central propeller; a drive motor for driving the central propeller; a useful load container; servo drive means arranged between the drive motor and the useful load container for displacing the useful load container relative to the drive motor; and torque-balancing means rotatable in a direction opposite to a rotational direction of the central propeller, wherein the torque-balancing means is formed as one of rotatable elements of the drive motor, a second motor with balancing masses, an exhaust turbine, a ring, a disc, a cylinder, and a collar with a side wing.

11. An aircraft according to claim 10, wherein the torque-balancing means comprises rotatable masses (35, 35a) adjustable at least one of radially outwardly and radially inwardly.

* * * * *